April 16, 1940.　　D. J. CAMPBELL　　2,196,980
ENGINE
Filed Feb. 10, 1938　　6 Sheets-Sheet 1
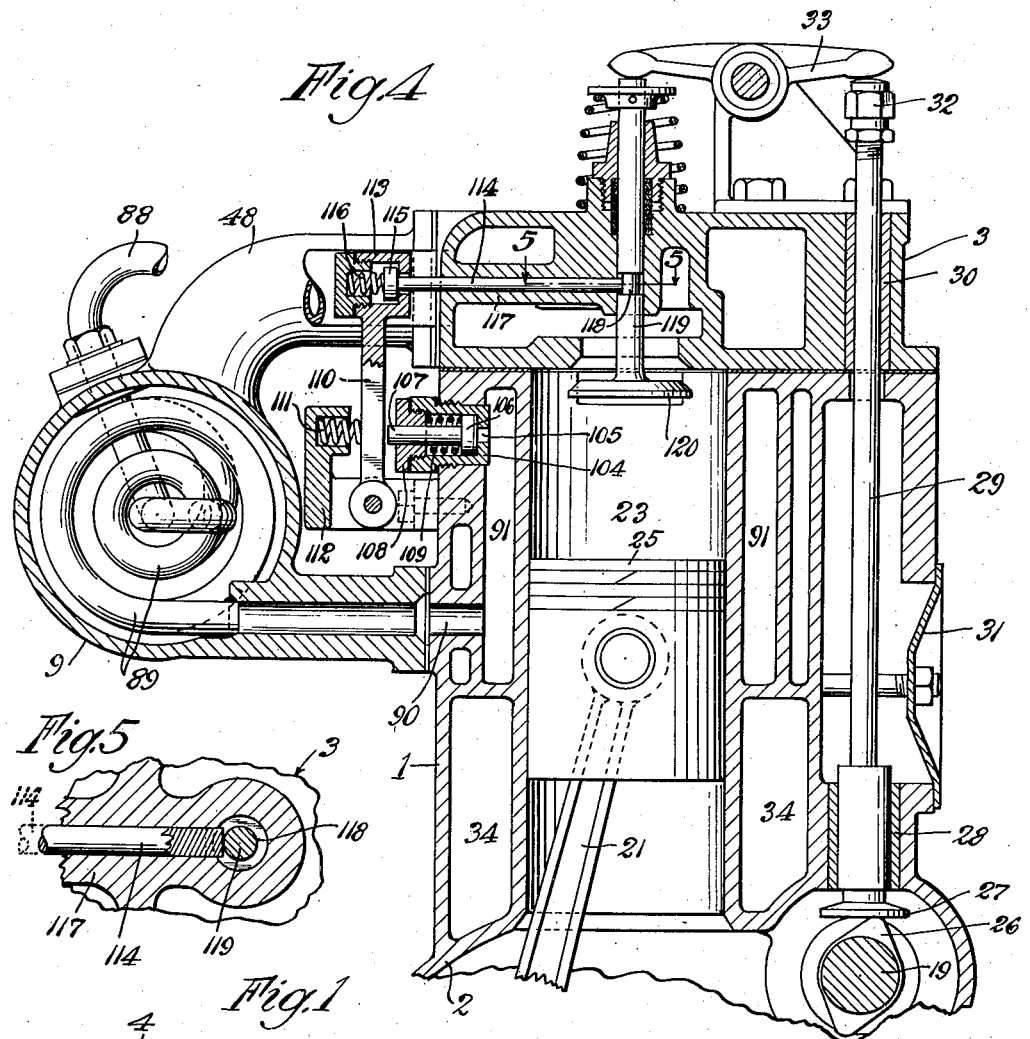
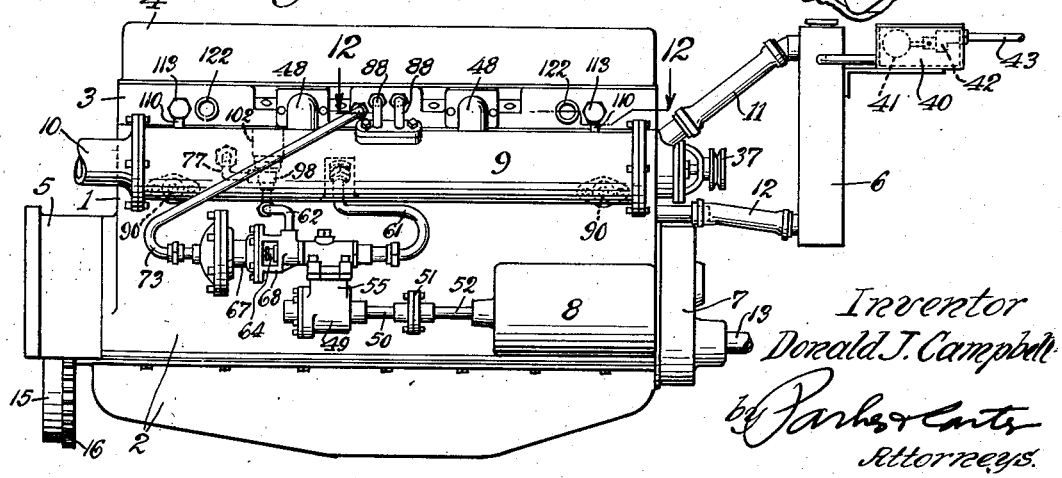
Inventor
Donald J. Campbell
by Parker & Carter
Attorneys.

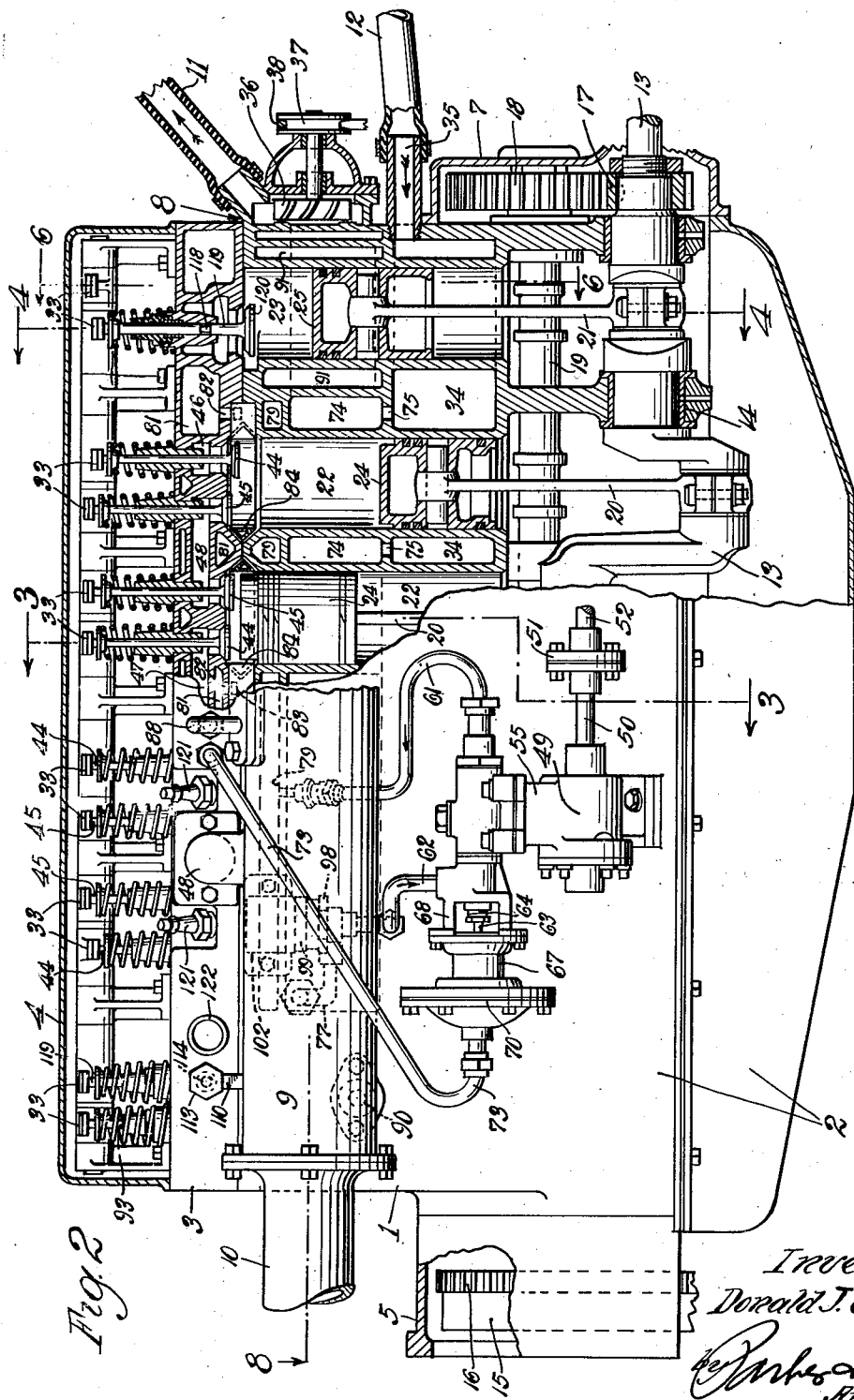

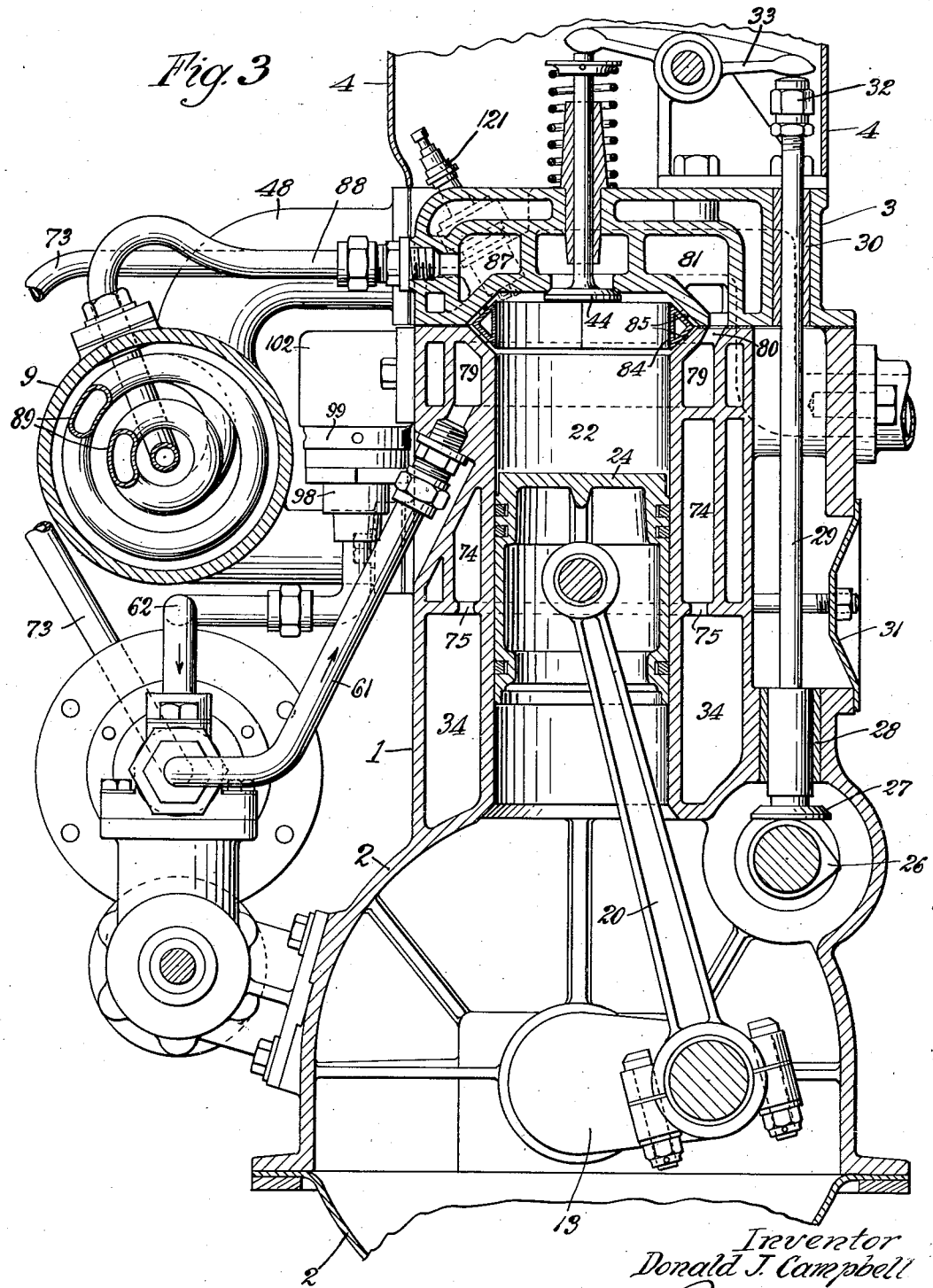

April 16, 1940. D. J. CAMPBELL 2,196,980
ENGINE
Filed Feb. 10, 1938          6 Sheets-Sheet 4
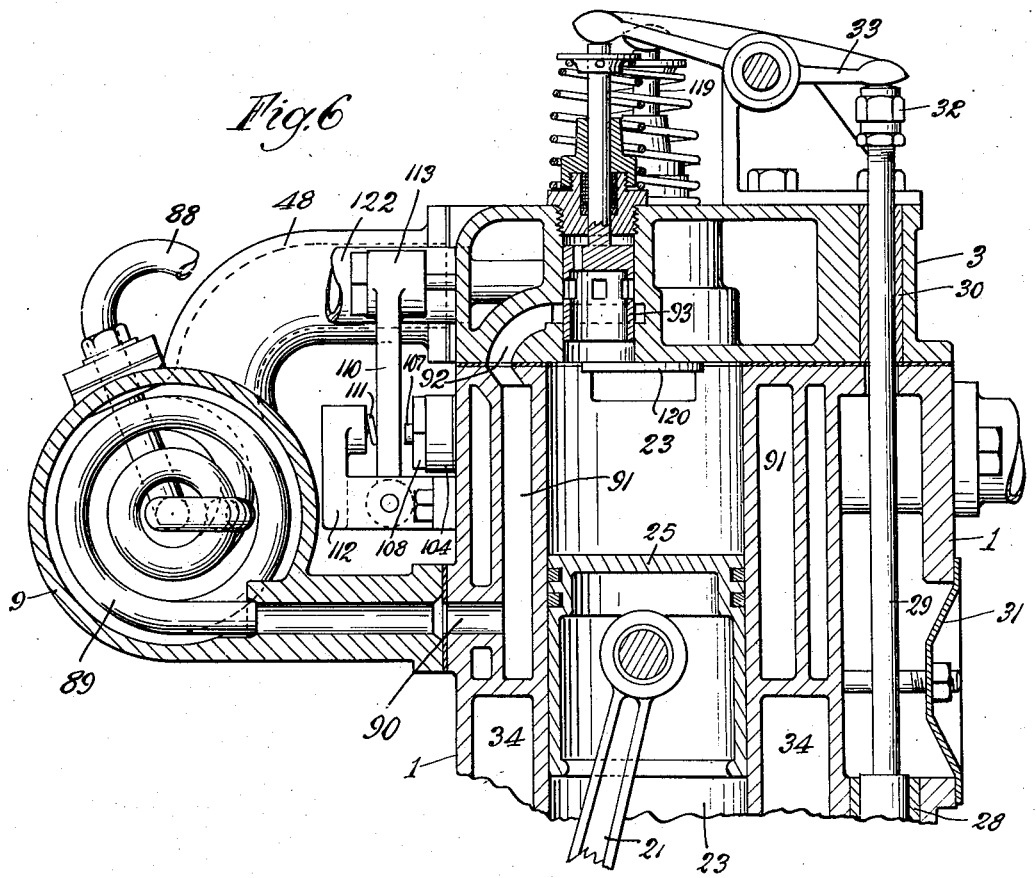
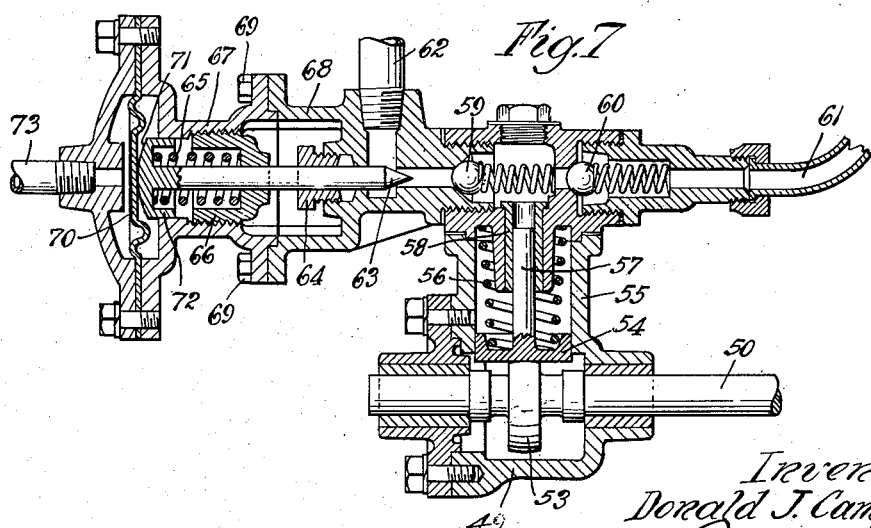
Inventor
Donald J. Campbell
by Parker & Carter
Attorneys.

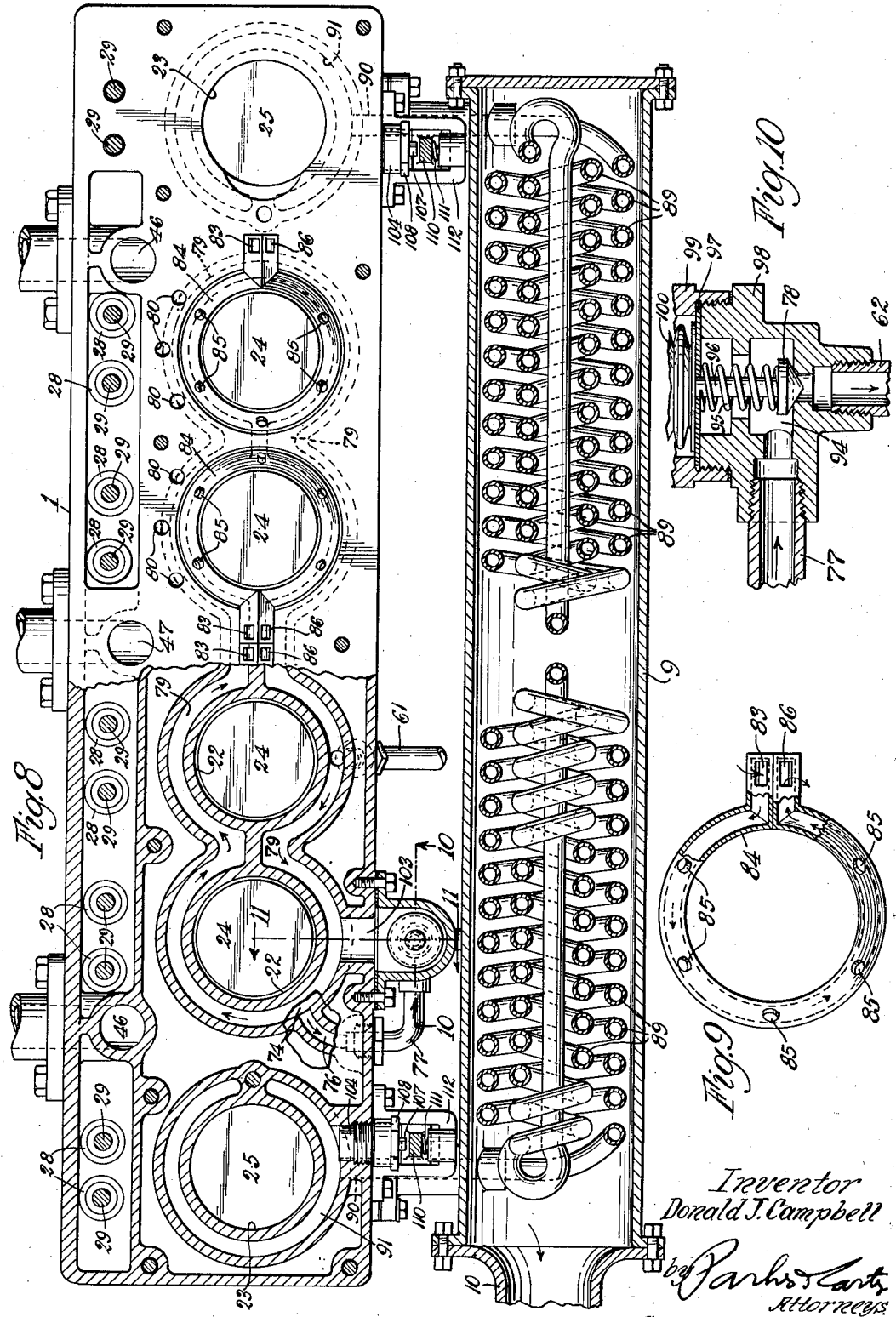

April 16, 1940.   D. J. CAMPBELL   2,196,980
ENGINE
Filed Feb. 10, 1938   6 Sheets-Sheet 6
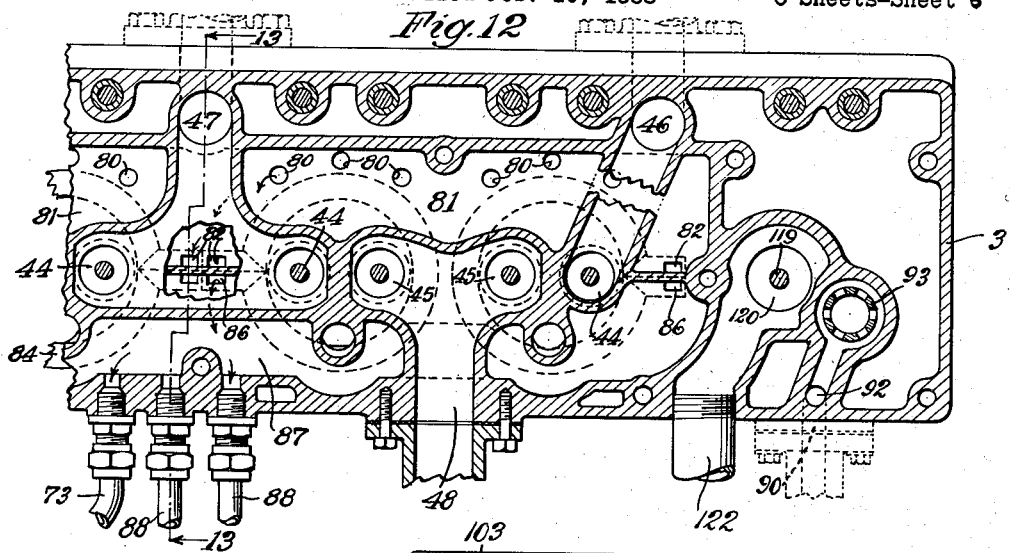
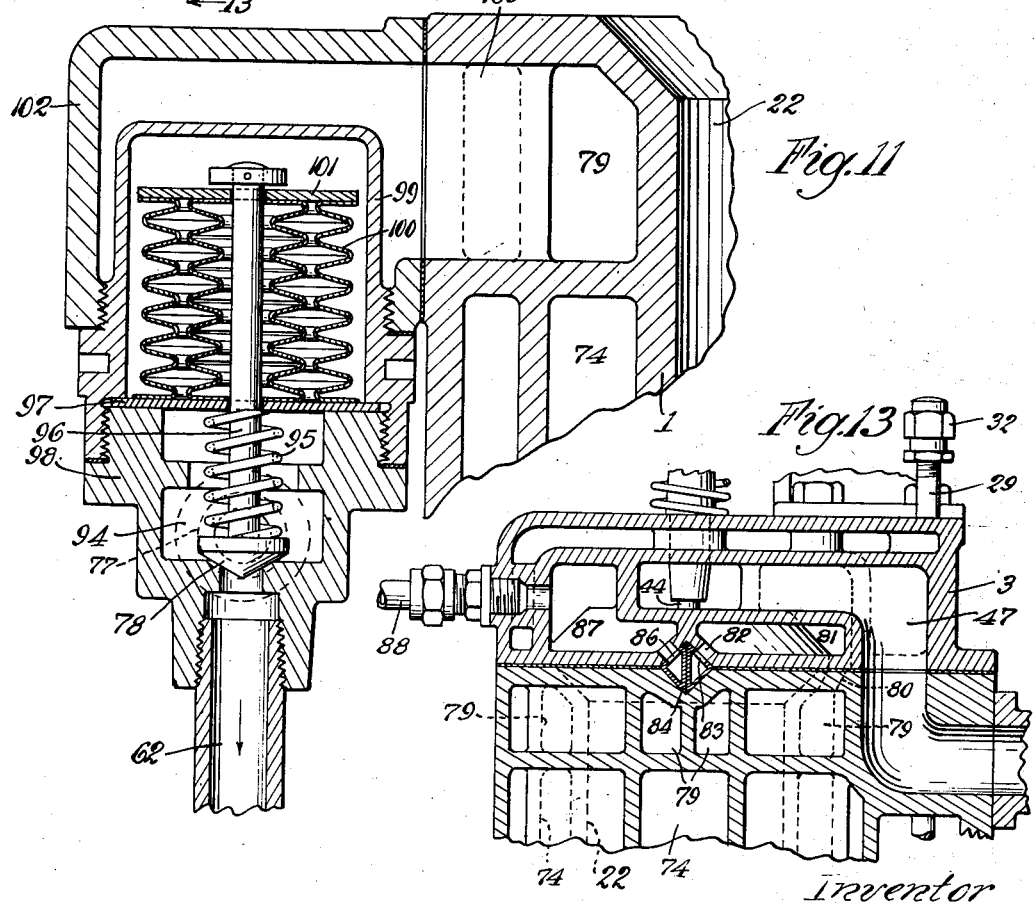
Inventor
Donald J. Campbell
by Parker & Carter
Attorneys Patented Apr. 16, 1940

2,196,980

UNITED STATES PATENT OFFICE 2,196,980

ENGINE

Donald J. Campbell, Muskegon Heights, Mich., assignor of one-half to James F. Campbell, Muskegon, Mich., and one-fourth to Islay Investment, Incorporated, Muskegon, Mich.

Application February 10, 1938, Serial No. 189,728

13 Claims. (Cl. 60—14)

My invention relates to improvements in engines particularly of the combined internal combustion and steam type wherein the heat developed in the internal combustion engine cylinder is used to generate steam, which steam is used as motive power in the steam engine cylinder.

Such devices of this general category as have been heretofore suggested are complicated and lead to difficulties in operation, manipulation and control. My invention contemplates such an engine wherein all that the operator has to do is to start the engine by a starter in the usual way by hand or electric current or the like and to thereafter control the engine by manipulation of the fuel supply to the internal combustion engine cylinder wherein the steam engine will so to speak float on the line, be automatically controlled to the response to the requirements of operation.

In order that this may be possible, it is necessary that the engine be so made that it can operate as an internal combustion engine alone, the steam system remaining in effect idle.

Automatic means are provided to bring the steam engine part of the system into operation when that is appropriate and to get it out of operation when that is necessary.

The steam is generated in what would otherwise be the water cooling system of the internal combustion engine cylinder and as soon as a temperature in this system reaches the point at which steam generation can take place, water is automatically introduced into the generating system and continues to be introduced responsive to engine rotation until the pressure in the system exceeds a predetermined point. At that time water introduction is stopped until the pressure falls below the required point where water will again be introduced. In dealing with a vaporizable fluid like steam, water pressure and temperature are interchangeable functions. Starting the engine from cold of course it will at first be undesirable to introduce water into the vaporizing system because it might find its way as water into the steam cylinder and cause damage. Therefore until the temperature has reached a predetermined point in the vaporizing control system, a temperature responsive control valve seals the water intake to the pump and the pump operates without injection of water. As soon as the temperature reaches a point where steam can be generated, this valve is opened and the pump commences to inject on each engine revolution a predetermined amount of water into the vaporizing system. The capacity of the pump is designed to be approximately that required to furnish the amount of water that can be vaporized by the engine and such water as furnished, flashes into steam and is distributed into the steam engine cylinder. If there is an excess of pressure resulting from excess of temperature, the water will be temporarily discontinued until pressure has dropped below the safety point. I propose also to provide means whereby the exhaust valve of the steam engine cylinder will be held open until steam is supplied so that there will be a minimum of resistance to engine rotation caused by the idling steam engine cylinder.

Reference is here made to my copending application of even date herewith, Serial Number 189,727.

It will be understood, of course, that while I have referred to water and steam, any vaporizable liquid might be used though water being safe and easily available, is probably under most circumstances the most satisfactory liquid for the generation of motive fluid.

My invention is illustrated more or less diagrammatically in the accompanying drawings, wherein—

Figure 1 is a side elevation of an engine embodying my invention;

Figure 2 is a fragmentary side elevation in part section with parts omitted on a larger scale similar to Figure 1;

Figure 3 is a section on an enlarged scale along the line 3—3 of Figure 2;

Figure 4 is a fragmentary section along the line 4—4 of Figure 2;

Figure 5 is a detail section along the line 5—5 of Figure 4;

Figure 6 is a section along the line 6—6 of Figure 2;

Figure 7 is a section through the water pump and control valve;

Figure 8 is a section along the line 8—8 of Figure 2;

Figure 9 is a detail in part section of one of the vaporizing rings;

Figure 10 is a detail section along the line 10—10 of Figure 8;

Figure 11 is a fragmentary section along the line 11—11 of Figure 8;

Figure 12 is a fragmentary section along the line 12—12 of Figure 1;

Figure 13 is a fragmentary section along the line 13—13 of Figure 12;

Like parts are indicated by like characters throughout the specification and drawings.

1 is a cylinder block; 2 a crank case; 3 a cylinder head; 4 a distribution valve housing; 5 a fly wheel housing; 6 a radiator; 7 the timing gear housing; 8 a generator housing; 9 the internal combustion engine exhaust manifold; 10 the exhaust pipe; 11, 12, are the water pipes connecting the engine cylinder block 1, with the radiator 6. 13 is a crank shaft mounted in crank shaft bearings 14, carrying a fly wheel 15, with starter gears 16. The front end of the crank shaft carries a pinion 17, which drives a gear 18, which in turn drives a cam shaft 19. 20 is the internal combustion engine cylinder connecting rod; 21 a steam engine cylinder connecting rod. 22, is an internal combustion engine cylinder; 23 a steam engine cylinder; 24, is an internal combustion engine piston; 25 is a steam engine piston. It will be noted that there may be a plurality of steam cylinders and a plurality of internal combustion engine cylinders and depending on the design, the number may be the same or different as the case may be.

The cam shaft has a plurality of cams 26, which engage followers 27, guided in sleeves 28, valve rods 29, guided in sleeves 30, access to the valve rods being obtained through the removable cover 31. These valve rods terminate in adjustable heads 32, adapted to engage valve rockers 33, enclosed within the housing 4. These rockers may control steam or internal combustion engine valves as the case may be.

The cylinder block has disposed therein surrounding the internal combustion and steam engine cylinders a plurality of water passages and reservoirs. 34, is a pre-heating reservoir immediately above the crank case to which water is supplied from the radiator through the pipe 12, and the sleeve 35. This water circulates and is withdrawn by the pump 36, driven by pulley 37, and belt 38, from the crank shaft, water being discharged to the radiator through the pipe 11, the purpose of this arrangement being to maintain a circulation of water through the system, the temperature of which will be maintained below the boiling point by the radiator.

40, is a float chamber associated with the radiator, containing a float 41, a valve 42. Water is supplied to the valve 42 through a pipe 43, from a suitable source of supply not here shown, the float maintaining the water in the radiator at a constant level, irrespective of withdrawals as will hereinafter appear.

Referring now to anyone of the internal combustion engine cylinders, the piston 24, is the usual type of internal combustion engine trunk piston. The cylinder is provided with intake valves 44 and the exhaust valves 45. The intake valves 44, receive combustible mixture from a carburetor not shown, entering through the intake passages 46, 47. The products of combustion controlled by the exhaust valves 45, pass out through the exhaust passages 48, to the exhaust manifold 9. 49 is a water injection pump shown in detail in Figure 7. 50, is the pump shaft driven through a universal coupling 51, from the generator shaft 52. 53, is a pump actuating cam on the shaft 50. It drives a cam follower or cross head 54, reciprocating in the sleeve 55, the spring 56 tending to hold the cross head down against the cam. 57, is a pump plunger reciprocating in the barrel 58. 59 is a spring pressed pump intake ball valve. 60, is a spring pressed pump exhaust ball valve. 61, is the water discharge passage, 62 the water intake passage. The water intake passage is controlled by a needle valve 63, slidable in a gland 64, and normally held off its seat by the spring 65. Tension on this spring may be adjusted by rotating the nut 66. This adjustment may only be made when the two parts of the control valve housing 67, 68, which are normally joined by the bolts 69, are separated. 70 is a valve control diaphragm engaging the curved faces 71, of the cross head 72 on the end of the valve stem. Pressure reaches this diaphragm through the steam pipe 73, so that when the steam pressure exceeds a predetermined point, the spring 65 will be overcome, the valve will seat and under these circumstances the pump plunger may continue to reciprocate but will feed no water. Associated with the pre-heating circulation chamber 34, is an additional pre-heating chamber 74, connected by means of ports 75, with the chamber 34. The chamber 74 surrounds all of the internal combustion engine cylinders but terminates below the cylinder head. 76, is a passage leading from the chamber 74, to communicate with a pipe 77, controlled by a valve 78, communicating with the pipe 62, so that the pump may draw pre-heated water from the engine cooling system. This water is discharged through the pipe 61, to a heating chamber 79, surrounding the extreme upper end of the internal combustion engine cylinders. A passage 80, leads therefrom to a chamber 81, in the cylinder head which surrounds the intake and exhaust valves and is in intimate contact with the walls of the cylinder head exposed to the heat of combustion.

Ports 82 lead from the chamber 81, to communicate with ports 83, of hollow coils 84, located in the upper end of each of the internal combustion engine cylinders and spaced by legs 85, as indicated, from the walls of the cylinder block and cylinder head. Ports 86, at the other end of each of these coils communicate with the chamber 87. There is thus a series of passages between the chambers 81 and 87 through each of the internal combustion engine cylinders. These coils 84, are preferably of copper or other metal which rapidly conducts heat.

Pipes 88, lead from this chamber 87, to coils 89, in the exhaust manifold. The opposed ends of these coils communicate by means of passages 90, with chambers 91, surrounding the upper ends of the steam engine cylinders. Passages 92, lead from chamber 91 to the balanced ported cylindrical steam distribution valve 93, which valve controls the supply of live steam to each of the two steam engine cylinders.

Referring now to the control valve shown in Figures 10 and 11, whose purpose is to insure that no water reaches the pump until the temperature in the system has reached a point such that the water will be vaporized into steam. 94 is a valve chamber. The valve 78, in this chamber is held normally on its seat by a spring 95, encircling the valve stem 96, and abutting against a plate 97. This plate is held against the exterior valve housing 98, by a thermostat cap 99, threaded in the housing 98. In this thermostat cap is a bellows type thermostat 100, abutting at one end on the plate 97, at the other end on a follower plate 101, mounted on the valve stem 96. This thermostat housing with the valve is threaded into a socket 102 communicating with the steam chamber 79, through a port 103. Until the temperature in the chamber 79 reaches the point at which steam will be vaporized, the spring 95 holds the valve 78 seated and since this valve is on the suction side of the pump system, pump operation may continue but no water will be fed. As soon as the temperature reaches the point where vaporization will take place, the thermostat overcomes the spring, unseats the valve and water then may enter the steam generating system.

The pipe 73 communicating with the diaphragm 70 in the pressure control valve communicates at the other end with the chamber 79, and so conducts steam under pressure to the diaphragm control valve. When the pressure of steam on its way to the steam engine cylinders exceeds a predetermined point, the valve 63, is closed, the spring 72, being overcome by the steam pressure and under these circumstances also, since this valve is on the suction side of the pump, the pump may continue to function but will inject no more water into the system until the excess steam in the system has passed out through the steam intake valve to the steam engine cylinders to bring the steam pressure down to the desired point.

During the time that the engine is functioning as an internal combustion engine exclusively without help from the steam, it is necessary that no resistance be built up in the steam engine cylinder. This is accomplished by providing means which automatically lock the steam engine exhaust valve upon until steam is fed. These means are shown in Figures 4 and 8, the chamber 91 being directly connected to the steam engine intake valve, is subjected to substantially the same pressure as the pressure in the engine cylinder. In the wall of this chamber 91 is threaded a plug 104, having a port 105, communicating with the chamber. 106 is a piston reciprocable in the plug 104, having a piston rod 107, traveling in the gland 108. 109, is a spring interposed between the gland and the piston tending to keep it seated. 110 is a lever abutting against the outer end of the piston rod 107. This lever is pivoted below the rod 107 and is held against it by a spring 111 in a bracket 112. The upper end of this lever 110, carries a socket 113 in which is loosely socketed the end of the push rod 114, having an enlarged head 115, engaged by a spring 116 which tends to yieldingly press the push rod to the right in Figure 4. This push rod travels in a guide 117 and when pushed to the right, its end is adapted to engage a latch recess 118 in the stem 119 of the exhaust valve 120 of the steam engine cylinder. When there is no pressure in the chamber 91, the spring 109 holds the piston 106 seated. The spring 111, holds the lever 110, against the piston and the spring 116, yieldingly urges the push rod 117, against the valve stem. As soon as the valve stem in its travel, driven by the valve mechanism descends far enough, the push rod engages the latch notch 118 and thereafter the exhaust valve is held off its seat independent of the operation of the cams, valve rods, lever arms and spring making up the valve actuating mechanism. This situation prevails until the pressure in chamber 91, reaches a point sufficient to overcome the springs 109, 111, at which time the push rod is withdrawn, and the exhaust valve resumes its functioning.

119 are the spark plugs. The rest of the electrical system is not illustrated as it forms no part of my present invention. 120 is the steam exhaust. It may exhaust directly into the air or into a condenser as the case may be.

The use and operation of my invention are as follows:

The lower part of the cylinder block serves as a circulatory pre-heating system, being associated as it is with the radiator and the water pump. This system is associated with the coolest part of the internal combustion engine cylinders and the temperature at which the mass of water in the system remains will be controlled by the radiator. This part of the system also is the part to which make-up water is added.

Above the direct circulation part of the system is an intermediate reservoir associated with warmer portions of the internal combustion cylinders and from the upper and so warmest part of this reservoir is periodically withdrawn the water which is to be vaporized to furnish steam for power in the steam engine cylinders. The pump which withdraws this water is a single acting pump so arranged that its pump piston excursion is constant and that its speed of rotation bears a direct and permanent relationship to the rate of rotation of the engine crank shaft, which crank shaft is driven both by the internal combustion and by the steam cylinders. The preheated water drawn into the pump is discharged therefrom into a series of passages and chambers circulating around the upper and hottest part of the cylinder itself, then circulating through the engine cylinder head, which is divided into two separate chambers with a plurality of heating coils associated with these two chambers, these coils being located in but out of contact with the walls of the piston cylinders so that all sides of these coils are exposed directly to the heat of combustion in the engine cylinder. These coils tend to prevent or minimize detonation because being entirely exposed to the temperature in the internal combustion engine cylinder, they serve much the same purpose as the direction injection of water which is so common in the engine especially designed to burn the heavier fuels.

The vapor or steam passing from the cylinder head chamber at last passes through the superheater coils in the exhaust manifold where the presence of these coils tends to cool the exhaust thereby preheating the steam and at the same time decreasing the temperature of the exhaust gases so as to decrease the pressure in the exhaust manifold. From these coils the steam returns to a steam chest or chamber surrounding the steam cylinder from which it goes to the ported balanced cylindrical intake valve, spent steam being discharged through the poppet type discharge valve.

Normally an engine such as this will be started cold as an internal combustion engine, and will idle without doing work until the temperature in the system reaches a point at which steam can be generated. During this time no water will be injected because the bellows type thermostat valve being directly exposed to the vaporizing chamber will not be heated sufficiently to overcome the spring pressure and open the valve until temperature high enough to generate steam has been reached. Meanwhile the pump piston reciprocates but since the pump intake is closed, there will be no feed of water.

Because there is no pressure in the steam chest associated with the steam clyinder, the automatic spring controlled exhaust valve lock out will go into operation. The plunger will catch the exhaust valve and lock it open and so the wide open exhaust valve will prevent the generation of pressure in the steam cylinder and will permit the steam piston or pistons to reciprocate without material resistance.

This situation prevails until first the temperature in the vaporizing system is high enough to generate steam. When this happens the thermostat will overcome the spring, opening the intake valve. Since the automatic float valve in the pre-cooling system maintains the pressure head always at the same point, there will be a sufficient pressure head to cause water to be supplied to the pump and the pump will inject measured quantities of water into the vaporizing system, thus generating steam. This will continue until the pressure in the steam chest associated with the intake valve reaches a predetermined point, after which the exhaust valve lock out will be released and the steam engine cylinder will carry its share of the load. Of course, prior to the time when the exhaust valve lock out is released, the steam intake valve will continue to function but until there is enough steam available to assist the steam engine in carrying the load, the locked open exhaust valve will permit such steam to escape freely into the atmosphere through the steam engine exhaust. If desired, a similar lock out could be associated with the steam distribution valve so that the steam ports would be maintained closed until pressure had reached a predetermined point though under ordinary circumstances however this is a refinement which would not be necessary.

There is no throttle control for the steam. All that the operator does is to control the engine speed by manipulating the usual throttle to control the internal combustion engine cylinders only. The result of this is that in order to take care of maximum load the steam capacity of the system will be set at a maximum and so in order to prevent too great pressure, an additional control for the water intake is provided. When the pressure in the steam chest resulting from an excess of water supply reaches a predetermined point, that pressure will overcome the spring, close the pressure controlled intake control to the pump and hold it closed until the pressure has come down to the minimum when the valve will open again and permit more water to be pumped and steam generated. This arrangement is satisfactory because as the amount of water fed is cut off, the temperature of the walls of the vaporizing chambers will increase so that as soon as more water is added, these hot surfaces will be able to take care of the sudden influx of water, thus maintaining a condition of substantial equilibrium.

The operator control of the internal combustion engine cycle is sufficient to control adequately the entire apparatus because controlling the internal combustion cycle controls not only the power generated by internal combustion part of the engine but also the heat generated and so made available to vaporize steam for the steam engine side.

The steam engine is single acting and the electrical part of the internal combustion engine system is not illustrated except for the spark plugs because it is normal and conventional. The stem engine might exhaust into a condenser or into the open air as the case may be. The details of the supply of water form no part of the present invention and are not illustrated.

The internal combustion engine cylinders might work on the Otto cycle. They might work on two cycle and they might be two or four cycle Diesel engines as the case may be. I have illustrated them for the purpose of convenience and simplicity as working on the Otto cycle with spark ignition.

I claim:

1. In an engine, an internal combustion cylinder and a steam cylinder, a vaporizing chamber formed within the walls of the internal combustion cylinder and means for supplying water thereto to generate steam, intake and exhaust valves for the steam cylinder, and means for conveying steam under pressure from the vaporizing chamber to the intake valve, automatic temperature responsive means for preventing the supply of water to the vaporizing chamber while the temperature therein is below a predetermined point and automatic pressure responsive means for preventing the supply of water to the vaporizing chamber while the pressure therein exceeds a predetermined point.

2. In an engine, an internal combustion cylinder and a steam cylinder, a vaporizing chamber formed within the walls of the internal combustion cylinder and means for supplying water thereto to generate steam, intake and exhaust valves for the steam cylinder, and means for conveying steam under pressure from the vaporizing chamber to the intake valve, automatic temperature responsive means for preventing the supply of water to the vaporizing chamber while the temperature therein is below a predetermined point and automatic pressure responsive means for preventing the supply of water to the vaporizing chamber while the pressure therein exceeds a predetermined point and means for holding the exhaust valve open during such time as steam is not supplied to the intake valve.

3. In an engine, an internal combustion cylinder and a steam cylinder, a vaporizing chamber formed within the walls of the internal combustion cylinder and means for supplying water thereto to generate steam, intake and exhaust valves for the steam cylinder, and means for conveying steam under pressure from the vaporizing chamber to the intake valve, automatic temperature responsive means for preventing the supply of water to the vaporizing chamber while the temperature therein is below a predetermined point and means for holding the exhaust valve open during such time as steam is not supplied to the intake valve.

4. In an engine, an internal combustion cylinder and a steam cylinder, a vaporizing chamber formed within the walls of the internal combustion cylinder and means for supplying water thereto to generate steam, intake and exhaust valves for the steam cylinder, and means for conveying steam under pressure from the vaporizing chamber to the intake valve, automatic pressure responsive means for preventing the supply of water to the vaporizing chamber while the pressure therein exceeds a predetermined point.

5. In an engine, an internal combustion cylinder and a steam cylinder, a vaporizing chamber formed within the walls of the internal combustion cylinder and means for supplying water thereto to generate steam, intake and exhaust valves for the steam cylinder, and means for conveying steam under pressure from the vaporizing chamber to the intake valve, automatic pressure responsive means for preventing the supply of water to the vaporizing chamber while the pressure therein exceeds a predetermined point, and means for holding the exhaust valve open during such time as steam is not supplied to the intake valve.

6. In an engine, an internal combustion cylinder and a steam cylinder, a housing for them forming with them a heating reservoir, a radiator and means for circulating water through said reservoir and radiator to maintain the temperature in the reservoir below the boiling point, a vaporizing chamber formed in the housing associated with the internal combustion engine cylinder, a pump adapted to draw water from the hottest portion of the reservoir and force it into the vaporizing chamber to generate steam and means for distributing such steam to and through the steam cylinder.

7. In an engine, an internal combustion cylinder and a steam cylinder, a housing for them forming with them a heating reservoir, a radiator and means for circulating water through said reservoir and radiator to maintain the temperature in the reservoir below the boiling point, a vaporizing chamber formed in the housing associated with the internal combustion engine cylinder, a pump adapted to draw water from the reservoir and force it into the vaporizing chamber to generate steam and means for distributing such steam to and through the steam cylinder, means for preventing the supply of water to the vaporizing chamber while the temperature therein is below a predetermined point.

8. In an engine, an internal combustion cylinder and a steam cylinder, a housing for them forming with them a heating reservoir, a radiator and means for circulating water through said reservoir and radiator to maintain the temperature in the reservoir below the boiling point, a vaporizing chamber formed in the housing associated with the internal combustion engine cylinder, a pump adapted to draw water from the reservoir and force it into the vaporizing chamber to generate steam and means for distributing such steam to and through the steam cylinder, means for preventing the supply of water to the vaporizing chamber while the temperature therein is below a predetermined point, and means for preventing the supply of water to the vaporizing chamber while the pressure therein exceeds a predetermined point.

9. In an engine, an internal combustion cylinder and a steam cylinder, a housing for them forming with them a heating reservoir, a radiator and means for circulating water through said reservoir and radiator to maintain the temperature in the reservoir below the boiling point, a vaporizing chamber formed in the housing associated with the internal combustion engine cylinder, a pump adapted to draw water from the reservoir and force it into the vaporizing chamber to generate steam and means for distributing such steam to and through the steam cylinder, means for preventing the supply of water to the vaporizing chamber while the temperature therein is below a predetermined point, and means for preventing the supply of water to the vaporizing chamber while the pressure therein exceeds a predetermined point, and means for holding the exhaust valve open during such time as steam is not supplied to the intake valve.

10. In an engine, an internal combustion cylinder and steam cylinder, a housing for them forming with them a heating reservoir, a radiator and means for circulating water through said reservoir and radiator to maintain the temperature in the reservoir below the boiling point, a vaporizing chamber formed in the housing associated with the internal combustion engine cylinder, a pump adapted to draw water from the reservoir and force it into the vaporizing chamber to generate steam and means for distributing such steam to and through the steam cylinder, means for preventing the supply of water to the vaporizing chamber while the pressure therein exceeds a predetermined point.

11. In an engine, an internal combustion cylinder and a steam cylinder having an intake and an exhaust valve, a housing for them forming with them a heating reservoir, a radiator and means for circulating water through said reservoir and radiator to maintain the temperature in the reservoir below the boiling point, a vaporizing chamber formed in the housing associated with the internal combustion engine cylinder, a pump adapted to draw water from the reservoir and force it into the vaporizing chamber to generate steam and means for distributing such steam to and through the steam cylinder, and exhaust valve and means for holding said exhaust valve open during such time as steam is not supplied to the intake valve.

12. In an engine, an internal combustion cylinder and a steam cylinder having an intake and an exhaust valve, a housing for them forming with them a heating reservoir, a radiator and means for circulating water through said reservoir and radiator to maintain the temperature in the reservoir below the boiling point, a vaporizing chamber formed in the housing associated with the internal combustion engine cylinder, a pump adapted to draw water from the reservoir and force it into the vaporizing chamber to generate steam and means for distributing such steam to and through the steam cylinder, means for preventing the supply of water to the vaporizing chamber while the pressure therein exceeds a predetermined point, an exhaust valve and means for holding said exhaust valve open during such time as steam is not supplied to the intake valve.

13. In an engine, steam and internal combustion cylinders, pistons reciprocably mounted in each, a crank shaft and connecting rods between each piston and the crank shaft, vaporizing passages associated with the internal combustion engine cylinders and adapted to be subjected to the heat of combustion, a pump driven in timed relation with the crank shaft for injecting measured quantities of water into the vaporizing passages, a valve on the intake side of the pump and yielding means for normally maintaining it open to permit supply of water to the pump, a pressure connection between the vaporizing passage and the valve whereby increase of steam pressure beyond a predetermined point overcomes the valve springs and seats the valve.

DONALD J. CAMPBELL.